United States Patent [19]

Berg et al.

[11] 3,920,604

[45] Nov. 18, 1975

[54] PRODUCTION OF POWDERY, FILLER-CONTAINING RUBBER MIXTURES AND THE USE THEREOF IN THE MANUFACTURE OF TIRE TREADS

[75] Inventors: Gerhard Berg; Karl-Heinz Nordsiek; Neithart Sommer; Egge Barnstedt; Gerhard Cuntze, all of Marl, Germany

[73] Assignee: Chemische Werke Huels Aktiengesellschaft, Marl, Germany

[22] Filed: Dec. 5, 1973

[21] Appl. No.: 421,819

[30] Foreign Application Priority Data
Dec. 9, 1972  Germany............................ 2260340

[52] U.S. Cl............... 260/42.54; 152/330; 159/2 R; 159/3; 159/4 R; 159/48 R; 260/34.2; 264/13
[51] Int. Cl.².......................... C08J 3/14; C08J 3/20
[58] Field of Search......... 260/42.54, 34.2; 159/2 R, 159/3, 4 R, 48 R; 264/13

[56] References Cited
UNITED STATES PATENTS

| | | | |
|---|---|---|---|
| 3,194,781 | 7/1965 | Hedberg et al. | 260/34.2 |
| 3,691,128 | 9/1972 | Vincent | 260/34.2 |
| 3,799,235 | 3/1974 | Moosavian et al. | 264/13 |
| 3,804,145 | 4/1974 | Arnold et al. | 159/48 R |

OTHER PUBLICATIONS

Goshorn et al.–Rubber World, October 1969, pp. 66–72.

*Primary Examiner*—Donald E. Czaja
*Assistant Examiner*—H. H. Fletcher
*Attorney, Agent, or Firm*—Millen, Raptes & White

[57] ABSTRACT

Discrete, finely divided, tack-free, pourable elastomer particles are prepared from a filler-containing organic solvent-elastomer suspension containing the elastomer dissolved in a volatile inert organic solvent and a solid, finely divided elastomer filler, by flash evaporation of the organic solvent to form discrete finely divided, tack-free elastomer particles.

The process can be applied to solid elastomers or to post-polymerization elastomer solutions, and is particularly suitable for preparing pourable, carbon black containing elastomer particles to be formed into shaped objects such as tires.

14 Claims, No Drawings

3,920,604

PRODUCTION OF POWDERY, FILLER-CONTAINING RUBBER MIXTURES AND THE USE THEREOF IN THE MANUFACTURE OF TIRE TREADS

CROSS-REFERENCE TO RELATED APPLICATIONS

Other techniques for preparing pourable, filler-containing elastomer particles from different starting materials are described and claimed in commonly assigned U.S. Pat. No. 3,846,365 and U.S. patent application Ser. No. 343,433 filed Mar. 21, 1973, the contents of which are incorporated by reference herein.

BACKGROUND OF THE INVENTION

This invention relates to the preparation of powdery, pourable, discrete, finely divided, tack-free filler-containing elastomer particles. More particularly, this invention relates to a process for preparing such particles from admixtures comprising a solution of an elastomer in an organic solvent and a filler in an organic solvent.

The processing of thermosetting elastomers into shaped objects is normally a multistage procedure. In contrast to the manufacture of molded components from thermoplastic synthetic resins, it is absolutely necessary, prior to the final shaping step, to conduct a generally complicated mixing process to obtain homogeneous incorporation of diverse additives prior to the cross-linking reaction. The relatively high viscosity of the raw materials makes it necessary to utilize heavy machines, e.g., rolling mills or internal mixers, which perforce require a high energy consumption. The inherent considerable costs of such energy and equipment greatly impair the economy of the production of elastomeric materials.

The statistical distribution homogeneity required of the various components in the elastomer mixtures necessitates, in addition to high equipment investment costs, considerable expenditures in time and energy. During solid state homogenization, the rubber particles and the filler particles are displaced against a strong resistance with respect to one another. Even those portions of the mixture which are sufficiently homogeneous must be further subjected to the mixing procedure until a satisfactory dispersion of the entire mixture has been achieved. The frictional heat generated requires a discontinuous mode of operation. In order to minimize the danger of premature vulcanization, at least a portion of the vulcanizing agents are not added until a second operating step. However, the preparation of cross-linkable elastomers sufficiently stable for even intermediate storage periods requires expensive measures and is effected, in modern large-scale plants, by expensive pelletizing and storage in rotating containers. Further processing involves the subsequent preparation of a blank on calenders and/or extruders, depending on the type of the finished article. The conventional production method is then completed by vulcanization in presses or autoclaves.

Due to the characteristic properties of the raw elastomer material, severe limitations have been encountered in numerous attempts to devise economical, and especially automated manufacturing methods. In order to simplify the aforementioned operating steps, the masterbatches comprising coprecipitates of aqueous elastomer emulsions with carbon black have been proposed, by means of which other mixture components can be incorporated. However, due to their strong inherent tackiness, such raw elastomer mixtures are commercially prepared as bales of hard, solid consistency analogous to the filler-free polymers. Consequently, in spite of cost savings in producing the basic mixture, the machinery traditionally utilized for further processing operations could not be eliminated.

In another attempt to simplify production of elastomer-filler mixtures, solutions of polymers produced by the polymerization of conjugated dienes in solution have been thoroughly mixed with a dispersion of the rubber additives in a liquid hydrocarbon, and the polymer has been mixed with a vulcanization accelerator only after it had been separated from the liquid hydrocarbon. See German Published Application DAS No. 1,470,920. The crumbly mixtures obtained according to this process, which tend to stick together, require the traditional mechanical devices employed for further processing.

It is also known to produce premixes from a synthetic rubber prepared in an organic solvent and carbon black by mixing the solution or dispersion of the synthetic rubber in the solvent serving as the polymerization medium with an aqueous carbon black slurry. See DAS No. 1,470,753. In accordance with this process, only crumbs are obtained, as would be expected with the use of steam.

Moreover, a crumbly basic mixture of a polymer and carbon black can be prepared in a similar manner by mixing a carbon black slurry in an aqueous or organic solvent with a solution of the polymer in an inert organic solvent, placing this mixture into intimate contact with a gaseous stream of a sufficient temperature and velocity such that the mixture is sucked in and dried, and separating the thus-produced crumbly basic mixture. See German Unexamined Published Application DOS No. 2,147,429.

Finally, in accordance with another known process, a portion of the volatile substances contained in a liquid mixture of an elastomer is flash volatilized under conditions (vapor velocity 3–70 m./sec. and crumb concentration 0.25 – 25% by volume), whereby the residual mixture forms discrete crumbs. See DOS No. 2,154,422. Both of these processes likewise yield only crumbly products and, moreover, involve considerable capital equipment expenditures.

The aforementioned copending U.S. patent applications describe processes for the preparation of pourable, powdery, tack-free filler-containing elastomer particles from an aqueous emulsion of an elastomer dissolved in a volatile inert organic solvent having an emulsifying amount of surfactant, and an aqueous suspension or dispersion of a filler. While representing a substantial advance in simplifying processing techniques, the preparation and processing of the aqueous emulsions and their by-products nonetheless represent a substantial cost factor.

In view of the above-described difficulties encountered in the manufacture of heretofore known rubber mixtures, and the uneconomical processability of the latter, there thus is still a real need for an economical procedure to produce powdery, pourable, filler-containing, especially carbon-black-containing, rubber mixtures.

OBJECTS OF THE INVENTION

Accordingly, it is an object of this invention to provide a process for preparing discrete, finely divided, tack-free elastomer particles.

Another object of this invention is to provide a process for preparing pourable, filler-containing non-caking elastomer particles from a solution of an elastomer in an inert organic solvent.

A further object of this invention is to provide a process for preparing discrete, finely divided, pourable, tack-free elastomer particles containing a carbon black filler.

An additional object of this invention is to provide a process for preparing discrete, finely divided, tack-free elastomer particles containing a mineral oil plasticizer.

A more particular object of this invention is to provide pourable elastomer particles containing a carbon black filler.

Other objects and advantages of this invention will become apparent to those skilled in the art upon further study of the specification and appended claims.

SUMMARY OF THE INVENTION

Briefly, the above and other objects are attained in one aspect of this invention by providing a process for the preparation of discrete, pourable, powdery, non-caking filler-containing elastomer particles having an average diameter of 10–1000 $\mu$, which comprises: (a) admixing a solution of an elastomeric polymer selected from the group consisting of polybutadiene having a proportion of vinyl groups from 8 to 50 % and copolymers of butadiene with 10–60 % by weight styrene in which the proportion of vinyl groups in the butadiene present is from 8 to 30 % in a volatile, inert organic solvent, with 25–500 parts by weight of filler per 100 parts by weight of said polymer to form a homogeneous fluid mixture; and (b) expanding said homogeneous fluid mixture from a higher pressure at which said solvents are in the liquid phase to a lower pressure at which said solvents flash evaporate to form said filler-containing elastomer particles having a residual solvent content of less than about 1% by weight.

DETAILED DISCUSSION

A particularly simple and economical process has now been discovered for producing powdery, filler-container rubber mixtures by mixing rubber solutions with fillers and by subsequent flash vaporization of the organic liquids. In essence, the rubber solution, which has been obtained by the polymerization of butadiene or copolymerization of butadiene with styrene perferably in the presence of lithium catalysts and which optionally contains plasticizer oil, is mixed with fillers, and the thus-obtained pourable mixture is expanded from a higher toward a lower pressure, whereby the organic liquid is flash evaporated and the rubber-filler mixture is obtained as a pourable, non-caking powder.

Products having a solution viscosity [$\eta$] of between 1.0 dl/g and 7.0 dl/g can be used without difficulties. Suitable as the rubber materials within the scope of the claimed process are the elastomeric polymers obtained by the polymerization of butadiene or copolymerization of butadiene with styrene, preferably in the presence of lithium catalysts. This polymerization is conducted in a conventional manner, e.g., according to U.S. Pat. No. 2,975,160, German Published Application No. 1,300,329, and German Unexamined Laid-Open Application No. 1,495,655. The thus-produced polymers generally have a vinyl group content of 8–50%.

In accordance with a particularly advantageous embodiment of the present process, those rubbers are employed which have been prepared by adiabatic polymerization of butadiene in the presence of a catalyst system of organolithium compounds, on the one hand, and Lewis bases, on the other hand, and which consist of polybutadiene having proportions of vinyl groups of between 25% and 50%.

Especially suitable as the organolithium compounds are lithium hydrocarbon compounds, which include but are not limited to methyllithium, ethyllithium, n-, sec.-, and tert.-butyllithium, amyllithium, phenyllithium and cyclohexyllithium. The organolithium compounds are generally utilized in amounts of 0.01 – 0.1% by weight, preferably 0.02 – 0.05% by weight, based on the butadiene or butadiene + styrene monomers. Suitable Lewis acids include but are not limited to ethers, e.g., diethyl ether, di-n-propyl ether, diisopropyl ether, di-n-butyl ether, tetrahydrofuran, dioxane, ethylene glycol dimethyl ether, diethylene glycol dimethyl ether, diethylene glycol diethyl ether, triethylene glycol dimethyl ether, tetraethylene glycol dimethyl ether; and tertiary amines, e.g., trimethylamine, triethylamine, N,N,N',N'-tetramethylethylenediamine, N-methylmorpholine, N-ethylmorpholine or N-phenylmorpholine. The Lewis bases are used individually or in admixtures of two or more, generally in amounts of 0.01 – 10.0% by weight, preferably 0.05 – 5% by weight, based on the butadiene or butadiene + styrene monomer content.

The weight ratio of the Lewis base to the organolithium compound in the catalsyt system is 0.1 : 1 to 1000 : 1, preferably 1 : 1 to 250 : 1.

The polymerization is accomplished in the customary inert organic diluents which include but are not limited to iso- and n-butane, iso- and n-pentane, iso- and n-hexane, iso- and n-heptane, iso- and n-octane, cyclobutane, cyclopentane, cyclohexane, cycloheptane, cyclooctane, benzene; preferably in iso- and n-butane, iso- and n-pentane, iso- and n-hexane, iso- and n-heptane. The diluents can be used individually or in admixtures of two or more.

According to this invention, the exothermic polymerization of 1,3-butadiene or of 1,3-butadiene + styrene takes place adiabatically, i.e., the heat generated is allowed to remain in the reaction vessel, thereby causing a gradual rise in temperature.

Two temperature values are those characteristic for the polymerization of 1,3-butadiene or 1,3-butadiene + styrene under adiabatic conditions, namely, on the one hand, the initial temperatures of 30°–110°C at which the polymerization is started, and, on the other hand, the temperatures of 155°–250°C at which the polymerization is terminated, generally involving a temperature increase of 100°–150°C during the course of the reaction. The expression "adiabatic polymerization" means, in this connection, that no heat is supplied or removed during the course of the polymerization.

The rise in temperature occurring during the adiabatic polymerization is caused by the heat liberated during the polymerization of butadiene or of butadiene + styrene; the magnitude of this temperature rise in a given case of course depends on the specific heat of the diluent and on the ratio of the diluent to the butadiene or butadiene + styrene.

In addition to homopolybutadienes, copolymers are also suitable which consist of butadiene and at most 60% by weight of styrene and wherein the butadiene is linked in the 1,2-position to an extent of 8–30%.

The copolymerization is likewise effected preferably adiabatically. In this method, those block copolymers which consist of butadiene and at most 60% of styrene, preferably 20 – 50 % by weight and wherein the polybutadiene has vinyl group proportions of 8–30% are suitable. Also suitable for this purpose are statistically random copolymers produced analogously to homopolymers, consisting of butadiene and at most 40% by weight, preferably 15 – 25 % by weight of styrene and wherein the butadiene is bound in the 1,2-position to an extent of 8–30%.

Suitable solvents for the conventional polymerization of butadiene or butadiene-styrene mixtures in solution are inert organic liquids, such as aliphatic, alicyclic, and aromatic compounds, having boiling points of between −5° and +85°C. Expecially suitable are organic liquid hydrocarbons such as butane, pentane, hexane, heptane, octane, cyclohexane and excess butadiene. The rubber solutions are mixed in the hot state with the fillers and/or filler dispersions in an organic liquid, preferably the rubber solvent.

It is particularly advantageous for conducting the process of this invention to mix the rubber solutions directly after termination of the adiabatic polymerization, still in the hot state, with the fillers and/or filler dispersions in an organic liquid, especially with additional polymerization solvents.

In place of the rubber solutions obtained by the polymerization of butadiene or butadiene-styrene mixtures in the presence of lithium catalysts, it is also possible to employ rubber solutions obtained by the redissolution of suitable finished polymers. This dissolving step is then followed by a heating step wherein the temperatures are increased until a pressure is obtained suitable for the expansion vaporization to be utilized according to the present invention. The elastomer solutions expanded in accordance with this invention generally contain 5 – 30, preferably 10 – 25 % by by weight of elastomer; the use of more dilute solution is uneconomical.

The temperatures of the mixture of rubber solution and fillers range between 50° and 280°C., preferably between 100° and 200°C. The filler content of the rubber solution is 25–500% by weight, preferably 50–150% by weight, based on the solids content dissolved in the rubber solution. The solutions are under a pressure of 1–70 atmospheres gauge.

The rubber solution is mixed with the fillers in a mixer, for example a continuous mixer or agitator-equipped vessel. Suitable fillers are known in the art and include but are not limited to carbon black and silicic acid.

Preferred fillers are the carbon blacks customary in the industry, which include carbon blacks of all stages of activity. Suitable carbon blacks include but are not limited to SAF (super abrasion furnace), ISAF (intermediate super abrasion furnace), HAF (high abrasion furnace), FEF (fast extruding furnace) and MT (medium thermal) blacks. In addition thereto, light-colored mineral fillers can also be added by mixing, e.g., highly active silicic acid. The amount of these fillers to be utilized is 25–500% by weight, preferably 50–150% by weight, based on the rubber.

Plasticizer oils can optionally be incorporated into the rubber solution prior to mixing the rubber solution with the fillers. Suitable mineral oil plasticizer oils are the refinery products usually employed for this purpose, which, depending on the particular purpose for which they are utilized, contain aromatic, naphthenic and/or paraffinic hydrocarbons and which are customarily introduced into the rubber solution after termination of the polymerization. In addition to these fillers, further auxiliary agents of various types can be added, such as antiaging substances, cross-linking agents and/or processing aids such as zinc oxide, stearic acid, sulfur, vulcanization accelerators, etc. The substances are added together with the aforementioned solid substances during the preparation of the solids suspension. It is advisable to determine for each particular case whether the auxiliary agents to be used besides the fillers are more advantageously added to the rubber-filler mixtures of this invention in powder-mixing asseblies or in other devices. It has surprisingly been found that the dry consistency, which is a condition for pourability of the rubber mixtures of this invention, remains preserved even if these mixtures have added thereto up to 50 parts by weight of mineral oil plasticizers, based on the rubber, in a powder mixer, e.g., simple agitator system such as the Loedige, Papenmeier or Henschel mixers.

In accordance with a special embodiment of the present process, the fillers, especially the carbon black, are dispersed in an organic liquid, preferably rubber solvent, before they are mixed with the rubber solution. This is effected with the aid of conventional comminuting or emulsifying machines, such as, for example, a machine known under the commercial name of "Supraton". The solids content of the suspensions can amount to 5–40% by weight, preferably 10–30% by weight, based on the solvent. Prior to the introduction of the carbon black suspension into the continuous mixer, wherein the suspension is combined with the hot rubber solution, which latter is under pressure, it is possible to heat the filler suspension to a temperature near that of the rubber solution.

Additionally, it is possible to mix the fillers, especially the carbon black, directly into the rubber solution, e.g., with the aid of suitable mixing screws.

The thus-obtained fluid pourable mixture is expanded, e.g., in a conventional expansion chamber, from a higher to a lower pressure. One suitable container is for example a spray-dryer of the Fa. Buss AG, Basel, Switzerland, but without the addition of a foreigh gas.

The container has a cylindrical shape in its upper portion and a conically tapering bottom in the lower portion. The mixture is introduced by means of an immersion tube disposed in the middle of the upper container lid and adjustable in its immersion length in the container. A valve or a nozzle having a variable cross section (e.g., a corner control valve) is disposed in the immersion tube at the inlet to the container.

One or more outlet openings for the solvent vapors are provided in the upper container lid. The container is equipped with a heating mantle in order to adjust the temperature of the container wall at the beginning of the expansion process to above the boiling temperature of the solvent. A discharge valve is arranged at the bottom of the container.

During the expansion of the mixture, the solvent is vaporized; due to the expanding solvent vapor, the flowing product stream is strongly accelerated and flows as a free jet into the container. Because of the low velocity of the vapor-solids mixture in the container, the solid particles form a sediment. The powdery, filler-containing rubber mixture is collected through a discharge valve at the conically tapered bottom of the container, whereas the solvent vapors flow through outlet openings at the lid of the container into a condenser. The expansion of the carbon-black-containing mixture to normal or atmospheric pressure takes place from pressures of between 5 and 20 atmospheres absolute, and at temperatures of 50°–280°C, preferably 100°–200°C.

While the rubber solvent evaporates spontaneously, the filler-containing rubber mixture is obtained as a pourable, non-caking fine powder. The powdery mixture contains, depending on the pressure to which the expansion in conducted, residual solvent contents of only between 0.1 and 1%. These residues, if necessary, are removed in a conventional dryer, e.g., a fluidized-bed, drum or disc dryer. The particle size of the powdery rubber mixture normally ranges between 10 and 1000 $\mu$, preferably from 250 to 700 $\mu$.

The powdery, filler-containing, optionally plasticizer-containing, rubber mixtures obtained according to the process of this invention are of great practical importance in the manufacture of shaped rubber objects of various types by the direct feeding of the powder mixtures into extruders, calenders, automatic transfer molding, as well as injection molding machines. When the auxiliary agents are added to these powdery rubber mixtures in the rubber processing plant, such admixing can be accomplished with the use of the aforementioned simple agitator systems. The powdery rubber mixtures, which optionally contain various fillers or additives, can be employed directly in the final stage of the customary rubber processing operation, i.e., in the shaping procedure, eliminating the heretofore necessary heavy machinery for the various mixing steps, in a surprisingly simple and economical manner. Quite particular advantages are provided by the powdery, filler-containing rubber mixtures in the production of tire treads. In this connection, the powdery constitution of the rubber mixtures of this invention offers favorable conditions for the use of automated conveying, metering, and mixing devices, making it possible to change discontinuously operating large-scale plants over to a continuous processing mode with reduced initial investment costs, energy expenditures and personnal wages.

The process claimed herein will be explained in greater detail with reference to the following examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

An agitator-equipped autoclave having a capacity of 280 liters is charged, under careful exclusion of air and moisture, with a total of 97.5 kg of hexane, 32.5 kg of butadiene, and 65 g of ethylene glycol dimethyl ether. The reaction solution is heated to 71°C and then mixed with 10 g of n-butyllithium. During the polymerization, which now commences, the autoclave is neither heated nor cooled, and thus an adiabatic reaction takes place. The polymerization is terminated after 5 minutes; the pressure has risen to 15.5 atmospheres gauge and the temperature to 179°C. The conversion amounts to 100%.

162.5 g of di-tert.-butyl-p-cresol is introduced into the hot, pressurized rubber solution. The thus-obtained polybutadiene has the following analytical data:

| | |
|---|---|
| Mooney viscosity (ML-4) | 101 |
| Gel content | 3.5% |
| Defo value | 1200/40 |
| Trans-1,4 content | 40% |
| Cis-1,4 content | 25% |
| Vinyl group (1,2) content | 35% |

The entire polybutadiene solution, having a temperature of 179°C and being under a pressure of 155 atmospheres gauge, is combined with 276 kg of a 10% ISAF carbon black suspension in hexane and heated in a heat exchanger to 180°C in a continuous mixer. The feeding of the two streams of substances is controlled so that the weight ratio of rubber to carbon black in the thus-produced mixture is 1:0.85. At the mixer outlet, the mixture is present at a temperature of 170°C and under a pressure of 14.0 atmospheres gauge. The mixture is immediately expanded via a nozzle or a valve into a container having a capacity of 1 m³ and being under atmospheric pressure. While the hexane is vaporized, a solid residue is obtained as a powdery rubber-carbon black mixture which collects at the bottom of the container. The hexane vapors flow via a conduit to a condenser. The mixture consists of a pourable, non-caking powder having particle sizes between 50 and 1000 $\mu$ and a residual hexane content of 0.5%. The crumbs producible according to the state of the art shown tendencies toward caking and thus cannot be handled as advantageously as the powders obtainable in accordance with the present invention.

EXAMPLE 2

An agitated autoclave, having a capacity of 280 liters, is charged under careful exclusion of air and moisture, with 104 kg of hexane, 22.88 kg of butadiene, 3.12 kg of styrene, and 26 g of ethylene glycol dimethyl ether. The reaction solution is heated to 74°C and then mixed with 9.88 g of n-butyllithium. During the polymerization, which now begins, the autoclave is neither heated nor cooled, whereby an adiabatic reaction takes place. After 6 minutes, a 100% conversion is attained. The temperature of the solution is 154°C, the pressure thereof is 10.3 atmospheres gauge. 130 g of di-tert.-butyl-p-cresol is introduced into the hot rubber solution, which latter is under pressure. The thus-obtained butadiene-styrene copolymer has the following analytical data:

| | |
|---|---|
| Styrene content | 12% |
| Butadiene content | 88% |
| Mooney viscosity (ML-4) | 62 |
| Gel content | <2% |
| Defo value | 1025/27 |
| Steric arrangement of the butadiene units: | |
| trans-1,4 | 36% |
| cis-1,4 | 28% |
| vinyl groups (1,2-) | 24% |
| Block homopolystyrene content | 3.2% |

The entire thus-obtained quantity of the copolymer solution, having a temperature of 154°C and being under a pressure of 10.3 atmospheres gauge, is combined in a continuous mixer with 221 kg of a 10% ISAF black suspension in hexane, heated to 155°C in a heat exchanger. The two streams of substance fed are controlled so that the weight ratio in the thus-formed mixture of rubber to carbon black is 1 : 0.85. At the mixer outlet, the mixture is obtained at a temperature of 142°C and under a pressure of 9 atmospheres gauge. The mixture is immediately expanded via a nozzle or valve into a container being under atmospheric pressure and having a capacity of 1 m³. While the hexane is vaporized, a solid residue is obtained as a powdery rubber-carbon black mixture which accumulates on the bottom of the container. The hexane vapors flow via a conduit to a condenser. The residual hexane content of the powder is 0.6%, and the particle sizes range between 50 and 1000 $\mu$. The powder mixture is pourable and non-caking.

EXAMPLE 3

100 kg of a 25% solution of a polybutadiene in hexane, produced by adiabatic polymerization in solution according to Example 1 and having a vinyl group content of 35%, a Mooney viscosity of 91, a temperature of 195°C and being under a pressure of 20 atmospheres gauge, is combined in a continuous mixer with 150 kg of a 10% suspension of highly active silicic acid (trade name "Utrasil" VN 3) in hexane previously heated in a heat exchanger to 195°C. The two substance streams are fed by controlling them so that, in the thus-obtained mixture, the weight ratio of rubber to silicic acid is 1 : 0.6. The mixture is worked up as described in Example 1. The light-colored rubber mixture is powdery, pourable, and non-caking.

EXAMPLE 4

100 kg. of a 25% solution of a polybutadiene, prepared by adiabatic polymerization in solution according to Example 1 and having a vinyl group content of 35%, a Mooney viscosity of 91, a temperature of 180°C, and a pressure of 19 atmospheres gauge, is combined in a continuous mixer with a suspension in hexane, heated to 180°C, containing the following fillers and additives: 21.25 kg of HAF black (trade name "Corax" 3), 550 g of sulfur, 750 g of zinc oxide, 500 g of stearic acid, 300 g of N-cyclohexylbenzothiazolesulfenamide, and 250 g of diphenylnitrosamine. The mixture is worked up as set forth in Example 1, thus obtaining a freely flowing powder. If 12.5 kg of aromatic processing oil is added to this material in a Henschel-type powder mixer, the pourable consistency remains preserved. Suxh a mixture can be fed directly to an extruder for the production of passenger car tire treads. After vulcanization, a spectrum of properties ensues corresponding to the property level of the customary passenger car treads.

EXAMPLE 5

2.5 kg of plasticizer oil having a high aromatic content (trade name "Naphtholen" MV) is stirred into 100 kg of a 25% solution of a polybutadiene, produced by adiabatic polymerization in solution according to Example 1 and having a vinyl group proportion of 35 %, a Mooney viscosity of 91, a temperature of 185°C, and a pressure of 19 atmospheres gauge. The oil-containing solution is combined in a continuous mixer with 212.5 kg of a 10% ISAF black (trade name "Corax" 6) suspension in hexane, heated to 185°C. The rubber-carbon black proportion is 1 : 0.85. By the time the mixture has reached the outlet of the continuous mixer, the pressure has dropped to 17.5 atmospheres gauge and the temperature has decreased to 180°C. The mixture is worked up in accordance with Example 1 to a pourable, powdery rubber-carbon black mixture. After the admixture of vulcanization adjuvants in a powder mixer, the thus-produced freely flowing mixture can again serve analogously to Example 4 for the production of, inter alia, passenger car tire treads.

EXAMPLE 6

The adiabatic polymerization of butadiene described in Example 1 is conducted in pentane as the solvent. After termination of the polymerization, the polybutadiene solution, having a temperature of 150°C and being under a pressure of 20 atmospheres gauge, is mixed with carbon black and worked up. The product is a pourable, non-caking powder. The particle sizes range between 10 and 1000 $\mu$.

EXAMPLE 7

An agitated autoclave is filled, under careful exclusion of air and moisture, with 80 parts by weight of hexane, 20 parts by weight of 1,3-butadiene and 0.5 parts by weight of tetrahydrofuran, based on the butadiene. After heating the mixture to 49°C, 0.025% by weight of n-butyllithium (active catalyst), based on butadiene, is added thereto. By subsequent cooling, the preselected temperature of 49°C is further maintained. After a total of 4 hours of reaction time, the reaction is terminated. The ML-4 value of the rubber present in the solution is 98. The gel content is below 2%.

The thus-obtained polybutadiene has the following microsturcture:

| | |
|---|---|
| cis-1,4 content | 40% |
| trans-1,4 content | 27% |
| vinyl (1,2) content | 33% |

This polybutadiene is worked up, as described in Example 1, to a pourable, non-caking powder.

EXAMPLE 8

10 kg of a polybutadiene produced analogously to Example 7, having a vinyl group proportion of 35% and a Mooney viscosity of 91, is dissolved in 90 kg of hexane in a nitrogen-purged, dry, 280-liter, agitated autoclave. The solution is combined, under stirring, with 85 kg of a 10% ISAF carbon black suspension in hexane. The mixture is heated to 187°C, thus increasing the pressure to 19 atomspheres gauge. The hot mixture, which is under pressure, is subjected to an expansion vaporization according to Example 1 and worked up to a powdery, pourable rubber-carbon black mixture.

EXAMPLE 9

Into two reactors 1 and 2 (agitator-equipped autoclaves), under the exclusion of air and moisture, a mixture of 80 parts by weight of hexane, 16 parts by weight of 1,3-butadiene, and 4 parts by weight of styrene is introduced. The mixture is distributed between the two reactors so that reactor 1 contains one-third of the mixture and reactor 2 contains two-thirds of the mixture. After removing the impurities with n-butyllithium, reactor 1 is fed with 0.3 parts by weight of n-butyllithium (active catalyst), based on the total amount of the monomer. Within three hours, the content of the reactor 2 is then transferred into the first reactor. By cooling the latter, a temperature of 49°C is maintained during the entire reaction period. After a total of 4 hours, the reaction is terminated. The ML-4 value of the rubber present in the solution is 97. The proportion of block-like incorporated styrene is 2.5%. The gel content is below 2%. This copolymer is worked up, as described in Example 1, to a pourable, non-caking powder.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. a process for the preparation of discrete, pourable, powdery, non-caking filler-containing elastomer particles having an average diameter of 10–1000 $\mu$, which comprises:
    a. admixing i) a solution of an elastomeric polymer, said elastomeric polymer having a solution viscosity of 1–7 dl/gm. and being selected from the group consisting of polybutadienes having a vinyl group content of from 8 to 50% and copolymers of butadiene with 10–60% by weight styrene in which the vinyl group content in the polybutadiene present is from 8 to 30% in a volatile, inert organic solvent which solvent has an atmospheric pressure boiling point of about −5° to +85° C., with ii) 25–250 parts by weight per 100 parts by weight of said polymer of a solid, finely divided elastomer filler selected from the group consisting of silicic acid and carbon black to form a homogeneous fluid mixture consisting essentially of said filler and said elastomer solution; and
    b. expanding said homogeneous fluid mixture from a higher pressure and an initial temperature of 50°–280° C. at which said solvent is in the liquid phase across a pressure differential of about 5–20 atmospheres to a lower pressure at which said solvent flash evaporates to form said filler-containing elastomer particles having a residual solvent content of less than about 1% by weight.

2. A process according to claim 1, wherein said particles have an average diameter of 250–700 $\mu$.

3. A process according to claim 1, wherein said elastomer is obtained by adiabatic polymerization with a lithium-based catalyst.

4. A process according to claim 3, wherein said elastomer is a block copolymer of butadiene and 10 – 60% styrene.

5. A process according to claim 3, wherein said elastomer is a random copolymer of butadiene and 5 – 40% sytrene.

6. A process according to claim 1, wherein said filler is carbon black.

7. A process according to claim 6, wherein said carbon black is admixed directly into said polymer solution.

8. A process according to claim 6, wherein said carbon black is admixed as a 5–45% by weight dispersion or suspension in a volatile, inert organic solvent which is miscible with said polymer solvent.

9. A process according to claim 1, wherein said organic solvent is at least one member selected from the group consisting of alkanes of 4–8 carbon atoms, cyclohexane and butadiene.

10. A process according to claim 8, wherein said admixture is continuously conducted at a temperature of 100°–200°C.

11. A process according to claim 1, further comprising molding said particles into shaped objects.

12. A process according to claim 11, wherein said shaped objects are tire treads.

13. A process according to claim 1, further comprising incorporating up to 50 parts by weight of a mineral oil plasticizer into said elastomer solution prior to said admixing.

14. A process according to claim 3, wherein
    a. said elastomer solution comprises 10–25% by weight of an elastomer selected from the group consisting of butadiene homopolymers having a vinyl group content of 25–50%, block copolymers of butadiene and 20–50% by weight styrene wherein the polybutadiene component has a vinyl group content of 8–30%, and random copolymers of butadiene and 15–25% by weight styrene wherein the butadiene component has a vinyl group content of 8–30%;
    b. said elastomer filler comprises 50–150% by weight, based on the elastomer content in said elastomer solution, of said filler as a 10–30% by weight dispersion or suspension in a volatile, inert organic solvent which is miscible with said polymer solvent;
    c. said admixing is effected continuously at a temperature of 100°–200° C.; and
    d. said expansion is effected from a pressure of 5–20 atmospheres absolute to atmospheric pressure.

* * * * *